United States Patent
Sahin et al.

(10) Patent No.: US 11,570,030 B2
(45) Date of Patent: Jan. 31, 2023

(54) METHOD FOR NON-LINEAR DISTORTION IMMUNE END-TO-END LEARNING WITH AUTOENCODER—OFDM

(71) Applicant: University of South Carolina, Columbia, SC (US)

(72) Inventors: Alphan Sahin, Columbia, SC (US); David Matolak, Chapin, SC (US)

(73) Assignee: University of South Carolina, Columbia, SC (US)

( * ) Notice: Subject to any disclaimer, the term of this patent is extended or adjusted under 35 U.S.C. 154(b) by 16 days.

(21) Appl. No.: 17/065,949

(22) Filed: Oct. 8, 2020

(65) Prior Publication Data
US 2021/0111936 A1    Apr. 15, 2021

Related U.S. Application Data

(60) Provisional application No. 62/913,776, filed on Oct. 11, 2019.

(51) Int. Cl.
*H04L 27/26*   (2006.01)
*G06N 3/04*   (2006.01)

(52) U.S. Cl.
CPC ......... *H04L 27/265* (2013.01); *G06N 3/0454* (2013.01); *H04L 27/2615* (2013.01)

(58) Field of Classification Search
CPC ........ G06N 3/02; G06N 3/0454; G06F 30/27; H04L 41/16; H04L 27/2615; H04L 27/265; Y10S 706/902
See application file for complete search history.

(56) References Cited

U.S. PATENT DOCUMENTS

| 10,068,557 B1 * | 9/2018 | Engel ....................... G10H 7/10 |
| 10,074,038 B2 * | 9/2018 | Hsieh ..................... G06N 3/084 |

(Continued)

FOREIGN PATENT DOCUMENTS

| AU | 2018203368 A1 * | 2/2019 | ......... G06K 9/00449 |
| CA | 3055925 A1 * | 9/2018 | ........... C12Q 1/6886 |

(Continued)

OTHER PUBLICATIONS

A. Felix, S. Cammerer, S. Dörner, J. Hoydis and S. Ten Brink, "OFDM-Autoencoder for End-to-End Learning of Communications Systems," 2018 IEEE 19th International Workshop on Signal Processing Advances in Wireless Communications (SPAWC), 2018, pp. 1-5, doi: 10.1109/SPAWC.2018.8445920.*

(Continued)

*Primary Examiner* — Berhanu Tadese
(74) *Attorney, Agent, or Firm* — Burr & Forman LLP; Jeffrey H. Kamenetsky

(57) ABSTRACT

A new layer tailored for Artificial Intelligence-based communication systems to limit the instantaneous peak power for the signals that relies on manipulation of complementary sequences through neural networks. Disclosed is a method for providing non-linear distortion in end-to-end learning communication systems, the communication system comprising a transmitter and a receiver. The method includes mapping transmitted information bits to an input of a first neural network; controlling, by an output of the neural network, parameters of a complementary sequence (CS) encoder, producing an encoded CS; transmitting the encoded CS through an orthogonal frequency division multiplexing (OFDM) signal; processing, by Discrete Fourier Transform (DFT), the encoded CS, to produce a received information signal in a frequency domain; and processing, by a second neural network, the received information signal.

16 Claims, 9 Drawing Sheets

(56) References Cited

U.S. PATENT DOCUMENTS

| | | | |
|---|---|---|---|
| 10,102,064 B1* | 10/2018 | Baty | G06F 11/1012 |
| 10,127,659 B2* | 11/2018 | Hsieh | G06N 3/08 |
| 10,242,443 B2* | 3/2019 | Hsieh | G16H 30/40 |
| 10,268,883 B2* | 4/2019 | Sarkar | G06V 30/19147 |
| 10,305,553 B2* | 5/2019 | O'Shea | H04B 7/0413 |
| 10,332,001 B2* | 6/2019 | Rippel | G06V 30/19147 |
| 10,354,171 B2* | 7/2019 | Hsieh | G06V 10/993 |
| 10,388,404 B2* | 8/2019 | Baughman | G16B 40/20 |
| 10,503,593 B2* | 12/2019 | Baty | H03M 13/2906 |
| 10,893,495 B2* | 1/2021 | Ait Aoudia | H04W 56/001 |
| 11,057,634 B2* | 7/2021 | Schroers | H04N 19/513 |
| 2016/0232440 A1* | 8/2016 | Gregor | G06N 3/0454 |
| 2017/0116372 A1* | 4/2017 | Baughman | G06N 20/00 |
| 2018/0035892 A1* | 2/2018 | Lu | A61B 5/055 |
| 2018/0144243 A1* | 5/2018 | Hsieh | G06F 30/20 |
| 2018/0173994 A1* | 6/2018 | Rippel | G06V 30/19167 |
| 2018/0174047 A1* | 6/2018 | Bourdev | G06V 30/19173 |
| 2018/0176570 A1* | 6/2018 | Rippel | G06V 30/19173 |
| 2018/0176576 A1* | 6/2018 | Rippel | G06V 30/19167 |
| 2018/0367192 A1* | 12/2018 | O'Shea | G06N 3/0445 |
| 2019/0004898 A1* | 1/2019 | Baty | H03M 13/2906 |
| 2019/0050640 A1* | 2/2019 | Sarkar | G06V 30/19147 |
| 2019/0050987 A1* | 2/2019 | Hsieh | G16H 30/40 |
| 2019/0096038 A1* | 3/2019 | El-Khamy | G06N 3/08 |
| 2019/0162714 A1* | 5/2019 | Karimi | G01N 33/50 |
| 2019/0184561 A1* | 6/2019 | Yip | G06N 5/046 |
| 2019/0220975 A1* | 7/2019 | Hsieh | G16H 30/40 |
| 2019/0266490 A1* | 8/2019 | Rippel | G06V 30/19147 |
| 2019/0287217 A1* | 9/2019 | Cooke | G06N 3/0472 |
| 2019/0295692 A1* | 9/2019 | Baughman | G16B 40/20 |
| 2020/0228880 A1* | 7/2020 | Iyer | H04N 21/23424 |
| 2020/0334542 A1* | 10/2020 | Hoydis | G06N 3/02 |
| 2020/0343985 A1* | 10/2020 | O'Shea | H04B 17/3911 |
| 2021/0111936 A1* | 4/2021 | Sahin | H04L 27/265 |
| 2021/0118559 A1* | 4/2021 | Lefkofsky | G16B 20/00 |
| 2021/0160149 A1* | 5/2021 | Ma | H04L 41/0816 |
| 2021/0174248 A1* | 6/2021 | Wetherbee | G06N 20/10 |
| 2021/0266875 A1* | 8/2021 | Namgoong | G06N 3/0454 |
| 2021/0287138 A1* | 9/2021 | Chang | G06N 5/022 |
| 2021/0329515 A1* | 10/2021 | Sharma | H04W 36/08 |
| 2022/0292676 A1* | 9/2022 | Singh | G06T 7/20 |

FOREIGN PATENT DOCUMENTS

| | | | | |
|---|---|---|---|---|
| CN | 109547381 A | * | 3/2019 | H04B 10/116 |
| CN | 110516803 A | * | 11/2019 | G06F 17/15 |
| WO | WO-2018009770 A1 | * | 1/2018 | G01N 33/48771 |
| WO | WO-2018165600 A1 | * | 9/2018 | C12Q 1/6886 |
| WO | WO-2019193380 A1 | * | 10/2019 | G06K 9/627 |

OTHER PUBLICATIONS

P. Miao, B. Zhu, C. Qi, Y. Jin and C. Lin, "A Model-Driven Deep Learning Method for LED Nonlinearity Mitigation in OFDM-Based Optical Communications," in IEEE Access, vol. 7, pp. 71436-71446, 2019, doi: 10.1109/ACCESS.2019.2919983.*

A. Şahin and D. W. Matolak, "Golay Layer: Limiting Peak-to-Average Power Ratio for OFDM-based Autoencoders," ICC 2020—2020 IEEE International Conference on Communications (ICC), 2020, pp. 1-7, doi: 10.1109/ICC40277.2020.9149257.*

J. A. Davis and J. Jedwab, "Peak-to-mean power control in OFDM, Golay complementary sequences and Reed-Muller codes," Proceedings. 1998 IEEE International Symposium on Information Theory (Cat. No. 98CH36252), 1998, pp. 190-, doi: 10.1109/ISIT.1998.708788.*

Şahin et al. Golay Layer Limiting Peak-to-Average Power Ratio for OFDM-based Autoencoders, IEEE, 2020 (Year: 2020).*

Golay Code Decoder Using Auto Encoder, by Cho et al. IEEE, 2019 (Year: 2019).*

Alexander, et al., OFDM-Autoencoder for End-to-End Learning of Communications Systems, IEEE, 2018 (Year: 2018).*

Miao et al, A Model-Driven Deep Learning Method for LED Nonlinearity Mitigation in OFDM-Based Optical Communications, IEEE, May 2019 (Year: 2019).*

* cited by examiner

Table 1 Layer information at the transmitter, channel, and receiver

| | Label | Layer type | Node size |
|---|---|---|---|
| Transmitter | 'Input' | - | 9 (input bits) |
| | 'fullyConnected_tx1' | Fully Connected | 100 (arbitrary parameter) |
| | 'batch_tx1' | Batch normalization | 100 |
| | 'nonLinear_tx1' | ReLU | 100 |
| | 'fullyConnected_tx2' | Fully Connected | 100 (arbitrary parameter) |
| | 'batch_tx2' | Batch normalization | 100 |
| | 'nonLinear_tx2' | ReLU | 100 |
| | 'fullyConnected_tx3' | Fully Connected | 100 (arbitrary parameter) |
| | 'batch_tx3' | Batch normalization | 100 |
| | 'nonLinear_tx3' | ReLU | 100 |
| | 'f_txLast_CS' | Fully Connected | 11 (i.e., $m = 5$ input for the amplitude parameters, $m + 1 = 6$, phase parameters of Golay) |
| | 's_txLast' | Clipping layer | 11 (the parameter $r_1 = -1$ and $r_2 = 0.5$ for the first 5 inputs (i.e., $0.1 \leq e_n \leq 0.5$ for $n = 1,2,\ldots,5$), the parameter $r_1 = -2$ and $r_2 = 2$ for the last 6 inputs (i.e., $-2 \leq k_n \leq 2$ for $n = 0,1,\ldots,5$)) |
| | 'golay' | Golay layer | 11 input, 64 output ($2^5$ output for amplitude and $2^5$ output for the phase ($m = 5, H = 4, \alpha = 1$, and $\beta = \frac{\pi}{2}$, $e_0 = \frac{1}{2}\sum_{n=1}^{5} \ln\left(\frac{1+e^{2e_n}}{2}\right)$)) |
| | 'P2C' | Polar-to-Cartesian layer | 64 input, 64 output |
| Channel | 'noiseAWGN' | Gaussian noise layer | Gaussian noise with standard deviation 0.63246 (this is the design SNR) |
| Receiver | 'fullyConnected_rx1' | Fully Connected | 1000 (arbitrary parameter) |
| | 'batch_rx1' | Batch normalization | 1000 |
| | 'nonLinear_rx1' | ReLU | 1000 |
| | 'fullyConnected_rx2' | Fully Connected | 1000 (arbitrary parameter) |
| | 'batch_rx2' | Batch normalization | 1000 |
| | 'nonLinear_rx2' | ReLU | 1000 |
| | 'fullyConnected_rxOutput' | Fully Connected | $M = 2^9 = 512$ |
| | 'batch_output' | Batch normalization | $M = 2^9 = 512$ |
| | 'softmax' | Softmax layer | $M = 2^9 = 512$ |
| | 'Output' | crossentropyex | $M = 2^9 = 512$ |

FIG. 9

METHOD FOR NON-LINEAR DISTORTION IMMUNE END-TO-END LEARNING WITH AUTOENCODER—OFDM

CROSS REFERENCE TO RELATED APPLICATION

This Application claims priority to U.S. Provisional Patent No. 62/913,776, filed Oct. 11, 2019, titled, Methods for Non-linear Distortion Immune End-to-End Learning with Autoencoder-OFDM.

BACKGROUND OF THE INVENTION

Field of the Invention

The present invention relates to a new layer tailored for Artificial Intelligence-based communication systems to limit the instantaneous peak power for the signals that relies on manipulation of complementary sequences through neural networks.

Description of Related Art

Traditional end-to-end learning (e.g., auto-encoder orthogonal frequency division multiplexing (AE-OFDM)) methods do not provide a permanent solution for PAPR without a rigorous training/optimization procedure, which may potentially increase the training complexity in practice. Solutions that control instantaneous power fluctuations are needed for artificial intelligence (AI) based transmitter and receivers to decrease the training complexity. Accordingly, it is an object of the present invention to provide a new layer tailored for AI-based communication systems to limit the instantaneous peak power for the signals that relies on manipulation of complementary sequences through neural networks. The current disclosure also provides how to stabilize the mean power and peak power by using the algebraic representation of the complementary sequences.

SUMMARY OF THE INVENTION

In one aspect of the present disclosure, a method for avoiding non-linear distortion in end-to-end learning communication systems, is provided, the communication system comprising a transmitter and a receiver. The method includes mapping transmitted information bits to an input of a first neural network; controlling, by an output of the neural network, parameters of a complementary sequence (CS) encoder, producing an encoded CS; transmitting the encoded CS through an orthogonal frequency division multiplexing (OFDM) signal; processing, by Discrete Fourier Transform (DFT), the encoded CS in a frequency domain, to produce a received information signal; and processing, by a second neural network, the received information signal.

In one embodiment of this aspect, the CS encoder comprises an amplitude encoder, a phase encoder, and a shift encoder. In another embodiment, mapping the transmitted information bits to an input of a first neural network further comprises manually tuning the shift encoder to adjust a position of non-zero elements of the CS; tuning the amplitude encoder and the phase encoder using the first neural network to produce tuned parameters; and mapping the information bits to the tuned parameters.

In another embodiment, the encoded CS is processed by multiple layers at the transmitter, the layers including at least a Golay layer, the method further comprising: controlling only the amplitude encoder and the phase encoder of the Golay layer; and forming an autoencoder which captures transmitter, channel, and receiver behaviors. In another embodiment, sets for the amplitude encoder and phase encoder are predetermined and offset by the first neural network in order to be able to transmit a large number of information bits.

In another embodiment, the receiver further comprises a decoder, the method further comprising: subtracting, by the second neural network, the offsets from the received information signal to produce a remaining information signal; and decoding, by the decoder, the remaining information signal. In another embodiment, the layers further include a clipping layer configured to limit the amplitude of the information signal. In another embodiment, the layers further include a Polar-to-Cartesian layer configured to convert the coordinate system from Polar coordinates to a Cartesian coordinate system.

In another aspect of the present disclosure, an end-to-end learning communication system for avoiding non-linear distortion is provided. The system includes: a transmitter implemented by processing circuitry, the processing circuitry comprising a processor and a memory containing instructions executable by the processor, the processor of the transmitter configured to: map transmitted information bits to an input of a first neural network; control, by an output of the neural network, parameters of a complementary sequence (CS) encoder, producing an encoded CS; and transmit the encoded CS through an orthogonal frequency division multiplexing (OFDM) signal. The system also including a receiver implemented by processing circuitry, the processing circuitry comprising a processor and a memory containing instructions executable by the processor, the processor of the receiver configured to: process, by Discrete Fourier Transform (DFT), the encoded CS in a frequency domain, to produce a received information signal; and process, by a second neural network, the received information signal.

In one embodiment of this aspect, the CS encoder comprises an amplitude encoder, a phase encoder, and a shift encoder. In another embodiment, The system of claim 10, wherein mapping the transmitted information bits to an input of a first neural network further comprises: manually tuning, by the processor of the transmitter, the shift encoder to adjust a position of non-zero elements of the CS; tuning, by the processor of the transmitter, the amplitude encoder and the phase encoder using the first neural network to produce tuned parameters; and mapping, by the processor of the transmitter, the information bits to the tuned parameters.

In another embodiment, the encoded CS is processed by multiple layers at the transmitter, the layers including at least a Golay layer, the processor of the transmitter further configured to control only the amplitude encoder and the phase encoder of the Golay layer; and form an autoencoder which captures transmitter, channel, and receiver behaviors. In another embodiment, sets for the amplitude encoder and phase encoder are predetermined and offset by the first neural network in order to be able to transmit a large number of information bits. In another embodiment, the processor of the receiver is further configured to: subtract, by the second neural network, the offsets from the received information signal to produce a remaining information signal; and decode, by the decoder, the remaining information signal. In another embodiment, the layers further include a clipping layer configured to limit the amplitude of the information signal. In another embodiment, the layers further include a Polar-to-Cartesian layer configured to convert the coordinate system from Polar coordinates to a Cartesian coordinate system.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein

FIG. 9 shows Table 1—Layer Information at the Transmitter, Channel, and Receiver.

Figure 1:
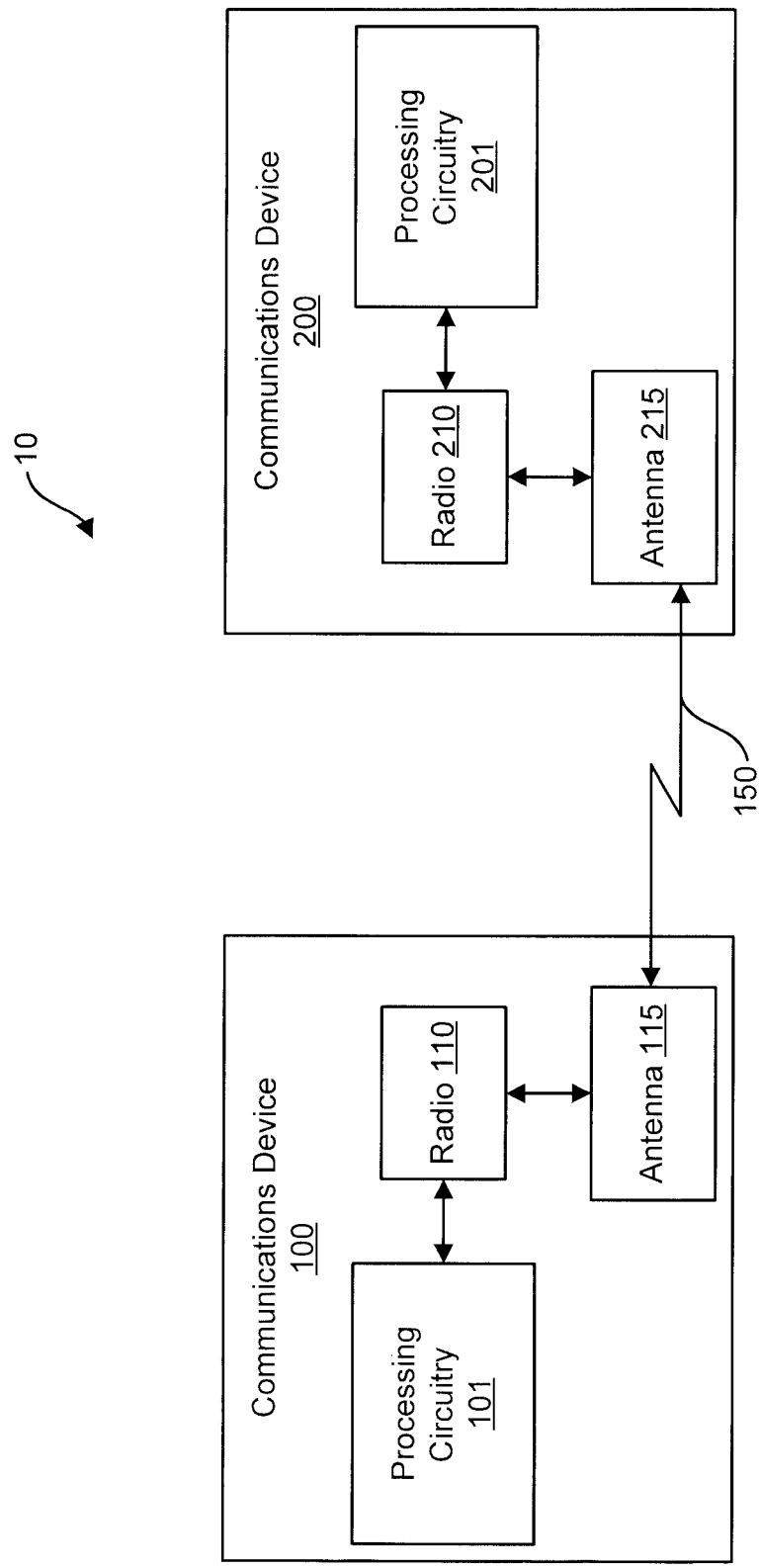
FIG. 1 illustrates an exemplary communications system in accordance with embodiments of the present disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

In view of the apparatuses and methods further disclosed herein, exemplary embodiments may be implemented in the context of a communications system 10 as shown in FIG. 1. The communications system 10 may be a complex system of intermediate devices that support communications between communications device 100 and communications device 200, or the communications device 100 and communications device 200 may have a direct link 150, as shown in FIG. 1. In either case, the communications devices 100 and 200 may be configured to support wireless communications. In the context of this disclosure, communications device 100 may be a transmitter and communications device 200 may be a receiver. Thus, below, reference designator "100" will be used interchangeably to identify a communication device and sometimes be used to identify the transmitter while reference designator "200" will be used to identify a communication device and sometimes be used to identify the receiver.

In this regard, the system 10 may include any number of communications devices, including communications devices 100 and 200. Although not shown, the communications devices may be physically coupled to a stationary unit (e.g., a base station or the like) or a mobile unit (e.g., a mobile terminal such as a cellular phone, a vehicle such as an aerial vehicle, a smart device with IoT capabilities, or the like).

The communications device 100 may comprise, among other components, processing circuitry 101, a radio 110, and an antenna 115. As further described below, the processing circuitry 101 may be configured to control the radio 110 to transmit and receive wireless communications via the antenna 115. In the regard, a wireless communications link 150 may be established between the antenna 115 and the antenna 215 of the communications device 200. Similarly, the communications device 200 may comprise, among other components, processing circuitry 201, radio 210, and the antenna 215. The processing circuitry 201 may be configured the same or similar to the processor 101, and thus maybe configured to control the radio 210 to transmit and receive wireless communications via the antenna 215.

Figure 2:
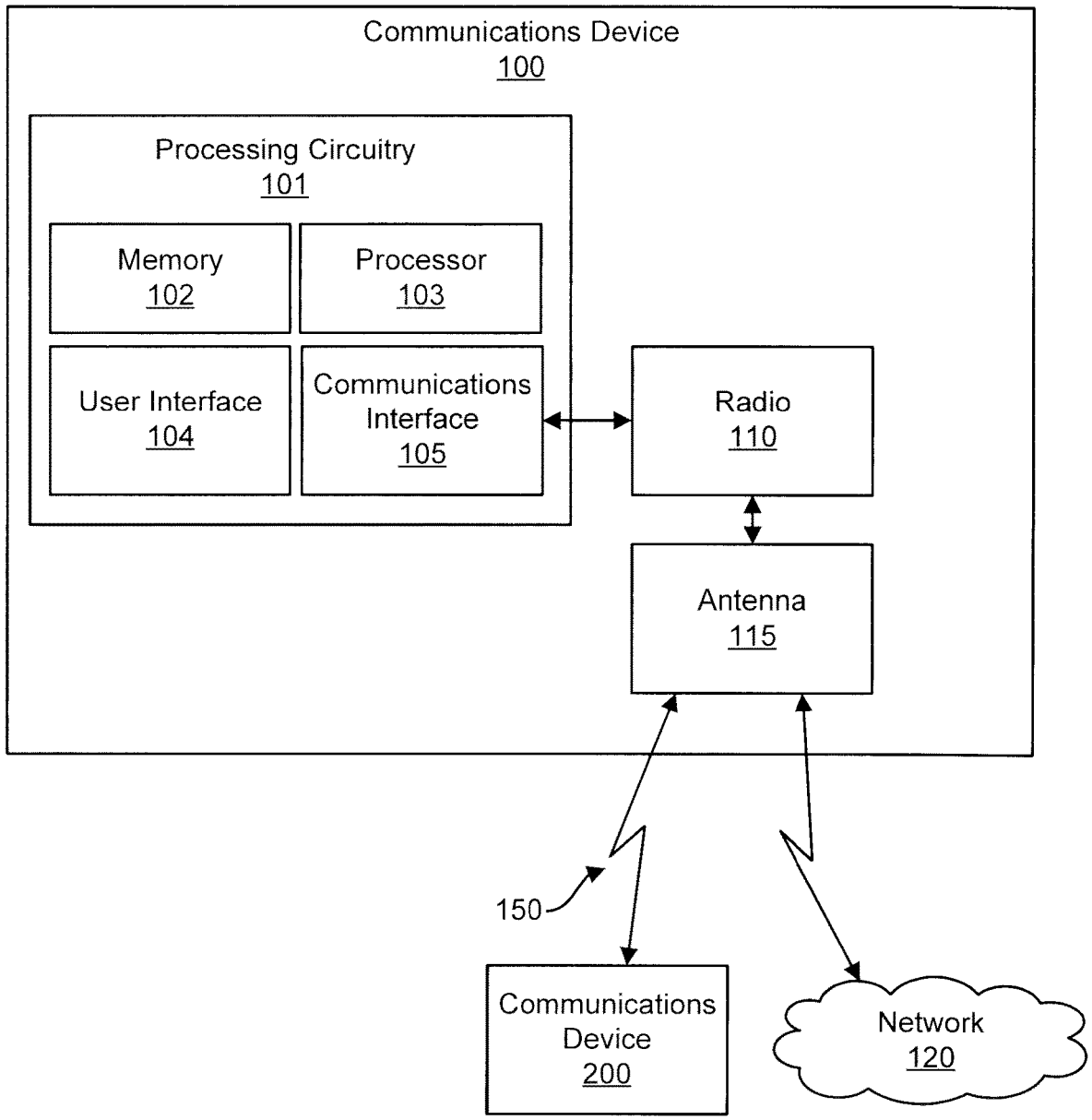
FIG. 2 illustrates an exemplary communications device in accordance with embodiments of the present disclosure.

In this regard, FIG. 2 shows a more detailed version of the communications device 100, and in particular the processing circuitry 101. Communication device 100 may also be considered part the transmitter of the present disclosure. Again, shown in FIG. 2, the communications device 100 may comprise the processing circuitry 101, the radio 110, and the antenna 115. However, the link 150 is shown as being a communications link to communications device 200, or as a communications link to the network 120, which may be any type of wired or wireless communications network.

The processing circuitry 101 may be configured to receive inputs and provide outputs in association with the various functionalities of the communications device 100. In this regard, the processing circuitry 101 may comprise, for example, a memory 102, a processor 103, a user interface 104, and a communications interface 105. The processing circuitry 101 may be operably coupled to other components of the communications device 100 or other components of a device that comprises the communications device 100.

Further, according to some example embodiments, processing circuitry 101 may be in operative communication with or embody, the memory 102, the processor 103, the user interface 104, and the communications interface 105. Through configuration and operation of the memory 102, the processor 103, the user interface 104, and the communications interface 105, the processing circuitry 101 may be configurable to perform various operations as described herein. In this regard, the processing circuitry 101 may be configured to perform computational processing, memory management, user interface control and monitoring, and manage remote communications, according to an example embodiment. In other words, the processing circuitry 101 may comprise one or more physical packages (e.g., chips) including materials, components or wires on a structural assembly (e.g., a baseboard). The processing circuitry 101 may be configured to receive inputs (e.g., via peripheral components), perform actions based on the inputs, and generate outputs (e.g., for provision to peripheral components). In an example embodiment, the processing circuitry 101 may include one or more instances of a processor 103, associated circuitry, and memory 102. As such, the processing circuitry 101 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 102 may include one or more non-transitory memory devices such as, for example, volatile or non-volatile memory that may be either fixed or removable. The memory 102 may be configured to store information, data, applications, instructions or the like. The memory 102 may operate to buffer instructions and data during operation of the processing circuitry 101 to support higher-level functionalities, and may also be configured to store instructions for execution by the processing circuitry 101. The memory 102 may also store image data, equipment data, crew data, and a virtual layout as described herein. According to some example embodiments, such data may be generated based on other data and stored or the data may be retrieved via the communications interface 105 and stored.

As mentioned above, the processing circuitry 101 may be embodied in a number of different ways. For example, the processing circuitry 101 may be embodied as various processing means such as one or more processors 103 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 101 may be configured to execute instructions stored in the memory 102 or otherwise accessible to the processing circuitry 101. As such, whether configured by hardware or by a combination of hardware and software, the processing circuitry 101 may represent an entity (e.g., physically embodied in circuitry—in the form of processing circuitry 101) capable of performing operations according to example embodiments while configured accordingly. Thus, for example, when the processing circuitry 101 is embodied as an ASIC, FPGA, or the like, the processing circuitry 101 may be specifically configured hardware for conducting the operations described herein. Alternatively, as another example, when the processing circuitry 101 is embodied as an executor of software instructions, the instructions may specifically configure the processing circuitry 101 to perform the operations described herein.

The communication interface 105 may include one or more interface mechanisms for enabling communication by controlling the radio 110 to generate the communications link 150. In some cases, the communication interface 105 may be any means such as a device or circuitry embodied in either hardware, or a combination of hardware and software that is configured to receive or transmit data from/to devices in communication with the processing circuitry 101. The communications interface 105 may support wireless communications via the radio 110 using various communications protocols (802.11WIFI, Bluetooth, cellular, WLAN, 3GPP NR or the like).

The user interface 104 may be controlled by the processing circuitry 101 to interact with peripheral devices that can receive inputs from a user or provide outputs to a user. In this regard, via the user interface 104, the processing circuitry 101 may be configured to provide control and output signals to a peripheral device such as, for example, a keyboard, a display (e.g., a touch screen display), mouse, microphone, speaker, or the like. The user interface 104 may also produce outputs, for example, as visual outputs on a display, audio outputs via a speaker, or the like.

The radio 110 may be any type of physical radio comprising radio components. For example, the radio 110 may include components such as a power amplifier, mixer, local oscillator, modulator/demodulator, and the like. The components of the radio 110 may be configured to operate in a plurality of spectral bands. Further, the radio 110 may be configured to receive signals from the processing circuitry 101 for transmission to the antenna 115. In some example embodiments, the radio 110 may be a software defined radio.

The antenna 115 may be any type of wireless communications antenna. The antenna 115 may be a configured to transmit and receive at more than one frequency or band. In this regard, according to some example embodiments, the antenna 115 may be an array of antennas that may be configured by the radio 115 to support various types of wireless communications as described herein.

AI-based communication systems utilize machine learning modules (e.g., deep learning) to replace the functionality of the highly engineered blocks (e.g., coding, modulation, waveform etc.) in the physical layer of communication systems. However, the machine learning methods in the field of computer vision may not be directly applied to the communication systems as communication system may introduce different challenges. One of the challenges related to communication systems is the high instantaneous power fluctuations. Although there are some methods limit the instantaneous peak power in the literature, these methods may require further training to overcome the non-linearities. In this invention, we solve the instantaneous peak problem of AI-based communication system through by introducing a new layer, i.e., Golay layer.

In this document, we disclose a new layer (Golay layer) tailored for AI-based communication systems to limit the instantaneous peak power for the signals. The disclosed methods can also be applied to communication devices that operate under power-limited link budgets while autonomously decreasing the error rate for auto-encoder orthogonal frequency division multiplexing. The invention may be part of a wireless standard that allows AI-based communication systems. The disclosed method may also decrease the training complexity. The embodiment relies on the manipulation of the complementary sequences through neural networks. We disclose how to stabilize the mean power and peak power by using the algebraic representation of the complementary sequences. The introduced layer may be used with several other basic layers, such as the clipping layer and Polar-to-Cartesian layer 510 as the Golay layer 505 operates in the polar coordinate. By also changing the parameter of the Golay layer 505, it can also allow constant-amplitude sequence in the frequency domain.

Motivation and Problem Statement

Traditional end-to-end learning (e.g., auto-encoder orthogonal frequency division multiplexing (AE-OFDM)) methods do not provide a permanent solution for PAPR without a rigorous training/optimization procedure, which may potentially increase the training complexity in practice. Solutions that control instantaneous power fluctuations are needed for artificial intelligence (AI) based transmitter and receivers to decrease the training complexity.

Sequences and Waveforms

The polynomial representation of the sequence $a=(a_0, a_1, \ldots, a_{N-1})$ is given by $$p_a(z) = a_{N-1}z^{N-1} + a_{N-2}z^{N-2} + \ldots + a_0 \quad (1)$$

Based on the polynomial representation, the following interpretations can be made:

If $$z \in \left\{ e^{\frac{j2\pi t}{T}} \mid 0 \le t < T \right\},$$

$p_a(z)$ is equivalent to OFDM signal in time where T is the OFDM symbol duration and the frequency domain coefficients are the elements of a where $a_0$ is mapped to the DC tone.

If $$z \in \left\{ e^{\frac{j2\pi t}{T}} \mid 0 \le t < T \right\},$$

the instantaneous power of an OFDM symbol can be calculated as $|p_a(z)|^2 = p_a(z)p_a\cdot(z^{-1})$ as $p_a\cdot(z^{-1}) = (p_a(z))^*$. Thus, the peak-to-average-power ratio (PAPR) of $p_a(z)$ can be obtained by using $|p_a(z)|^2$ within a period of $$z = e^{\frac{j2\pi t}{T}}$$

where $t=[0, T)$.

Representation of a Sequence

Let $f$ be a function that maps from $\mathbb{Z}_2^m = ((x_1, x_2, \ldots, x_m) \mid x_i \in \{0,1\})$ to $\mathbb{S}$ as $$f(x_1, x_2, \ldots, x_m): \mathbb{Z}_2^m \to \mathbb{S}. \quad (2)$$

We associate a sequence $f$ of length $2^m$ with the function $f(x_1, x_2, \ldots, x_m)$ by listing its values as $(x_1, x_2, \ldots, x_m)$ ranges over its $2^m$ values in lexicographic order. In other words, the $(x+1)$th element of the sequence $f$ is equal to $f(x_1, x_2, \ldots, x_m)$ where $x = \sum_{j=1}^{m} x_j 2^{m-j}$ (i.e., the most significant bit is $x_1$). The sequence $x$ and $f(x)$ denote $(x_1, x_2, \ldots, x_m)$ and $f(x_1, x_2, \ldots, x_m)$, respectively. Note that if $\mathbb{S} = \mathbb{Z}_2$, $f(x)$ is a Boolean function. If $\mathbb{S} = \mathbb{Z}_H$, $f(x)$ is called a generalized Boolean function.

Algebraic Normal Form (ANF)

A generalized Boolean function can be uniquely expressed as a linear combination over $\mathbb{Z}_H$ of the monomials as $$f(x_1, x_2, \ldots, x_m) = f(x) = \sum_{k=0}^{2^m-1} c_k \underbrace{\prod_{j=1}^{m} x_j^{k_j}}_{ith\ monomial} = c_0 1 + c_1(x_1)_2 + c_2(x_2)x_2 + \ldots c_{m+1}(x_1 x_2)_2 + \ldots \quad (3)$$

where the coefficient of each monomial belongs to $\mathbb{Z}_H$ i.e., $c_k \in \mathbb{Z}_H$ and $k = \sum_{j=1}^{m} k_j 2^{m-j}$ and $x_j \in \mathbb{Z}_2$. Note that monomials, e.g., 1, $x_1, x_2, x_1 x_2, \ldots,$ and $x_1 x_2 \ldots x_m$ are linearly independent. Linear independence can be proven by using the definition of linear independence, i.e., $\Sigma_i a_i x^i = 0$ if and only if $a_i = 0$ for all x.

For example, let $m=3$ and $H=4$. Then $$f(x_1, x_2, x_3) = c_0 x_1^0 x_2^0 x_3^0 + c_1 x_1^0 x_2^0 x_3^1 + c_2 x_1^0 x_2^1 x_3^0 + \\ c_3 x_1^0 x_2^1 x_3^1 + c_4 x_1^1 x_2^0 x_3^0 + c_5 x_1^1 x_2^0 x_3^1 + c_6 x_1^1 x_2^1 x_3^0 + c_7 x_1^1 x_2^1 x_3^1. \quad (4)$$

Assume that $c\_0=3$ and $c\_5=2$ and other $c\_n=0$ for $n=1,2,3,4,6,7$. Then, $$f(x_1, x_2, x_3) = 3 + 2x_1 x_3 \quad (5)$$

As described herein, we associate a sequence $f$ of length $2^m$ with the function $f(x_1, x_2, \ldots, x_m)$ by listing its values as $(x_1, x_2, \ldots, x_m)$ ranges over its $2^m$ values in lexicographic order. In other words, the $(x+1)$th element of the sequence $f$ is equal to $f(x_1, x_2, \ldots, x_m)$ where $x = \sum_{j=1}^{m} x_j 2^{m-j}$ (i.e., the most significant bit is $x_1$)

$$f(x_1=0, x_2=0, x_3=0) = 3 + 2x_1 x_3 = 3 \bmod 4 = 3$$

$$f(x_1=0, x_2=0, x_3=1) = 3 + 2x_1 x_3 = 3 \bmod 4 = 3$$

$$f(x_1=0, x_2=1, x_3=0) = 3 + 2x_1 x_3 = 3 \bmod 4 = 3$$

$$f(x_1=0, x_2=1, x_3=1) = 3 + 2x_1 x_3 = 3 \bmod 4 = 3$$

$$f(x_1=1, x_2=0, x_3=0) = 3 + 2x_1 x_3 = 3 \bmod 4 = 3$$

$$f(x_1=1, x_2=0, x_3=1) = 3 + 2x_1 x_3 = 5 \bmod 4 = 1$$

$$f(x_1=1, x_2=1, x_3=0) = 3 + 2x_1 x_3 = 3 \bmod 4 = 3$$

$$f(x_1=1, x_2=1, x_3=1) = 3 + 2x_1 x_3 = 5 \bmod 4 = 1$$

Therefore, $f(x_1, x_2, x_3)=3+2x_1x_3$ leads to a sequence of $f=(3,3,3,3,3,1,3,1)$.

All the possible monomials construct a basis for the generalized Boolean functions. Since there are $2^m$ monomials for a given m, there are $H^{2^m}$ different generalized Boolean functions, each of which is a mapping $\mathbb{Z}_2^m \to \mathbb{Z}_H$.

If $f(x_1, x_2, \ldots, x_m)$ is over $\mathbb{R}$, the coefficient of each monomial belongs to $\mathbb{R}$, i.e., $c_k \in \mathbb{R}$ and the monomials construct a vector space over $\mathbb{R}$ and the dimensionality of the space is $2^m$. Therefore, different sets of $\{c_k | k=0, \ldots, 2^{m-1}\}$ lead to different sequences.

Aperiodic Auto Correlation (APAC) of a Sequence

Let $\rho_a(k)$ be the aperiodic autocorrelation of a complex sequence a of length N and $\rho_a(k)$ is expressed as $$\rho_a(k) \triangleq \begin{cases} \rho_a^+(k), & k \geq 0 \\ \rho_a^+(-k)^*, & k < 0 \end{cases} \quad (6)$$

Where $$\rho_a^+(k) \triangleq \begin{cases} \sum_{i=0}^{N-k-1} a_i^+ a_{1+k}, & 0 \leq k \leq N-1 \\ 0, & \text{otherwise} \end{cases} \quad (7)$$

Complementary Sequences

The pair of (a, b) is called a Golay complementary pair (GCP) if $$\rho_a(k)+\rho_b(k)=0, k\neq 0. \quad (8)$$

The sequence $a=(a_0, a_1, \ldots, a_{N-1})$ is defined as a complementary sequence (CS) if there exists another sequence $b=(b_0, b_1, \ldots, b_{N-1})$ which complements a as $\rho_a(k)+\rho_b(k)=0, k\neq 0$.

It has been shown that the PAPR of a CS can be less than 3 dB.

Complementary Sequence Encoder

The following theorem for constructing complementary sequences is provided:

Theorem: Let $\pi$ denote any permutation $(1,2, \ldots, m)$ and (a, b) be a Golay complementary pair (GCP) of length N and calculate $$f_o(x, z) = (p_a(z)(1 - x_{\pi(1)}) + p_b(z)x_{\pi(1)}) \quad (9)$$

$$f_r(x) = e_0 + e_m x_{\pi(m)} + \sum_{l=1}^{m-1} e_l(x_{\pi(l)} + x_{\pi(l+1)}) \quad (10)$$

$$f_i(x) = k_0 + \sum_{l=1}^{m} k_l x_{\pi(l)} + \frac{H}{2}\sum_{l=1}^{m-1} x_{\pi(l)}x_{\pi(l+1)} \quad (11)$$

$$f_s(x) = \sum_{n=1}^{m} d_n x_{\pi(n)} \quad (12)$$

where $x=(x_1, x_2, \ldots x_m)$ and $x=\sum_j^{2^m} x_j 2^{m-j}$ for $x_j \in \mathbb{Z}_2$, $e_n \in \mathbb{R}$, $k_n \in [0, H)$, $d_n \in \mathbb{Z}$ for $n=0,1, \ldots, m$. Then, the sequence c where its polynomial representation is given by $$p_c(z) = \sum_{x=0}^{2^m-1} f_o(x,z) \times e^{\frac{2\pi}{H}(f_r(x)+jf_i(x))} \times z^{f_s(x)+xN} \quad (13)$$

is a complementary sequence (CS).

The polynomial $p_c(z)$ forms an OFDM symbol for $$z = e^{\frac{2\pi t}{T}}$$

and limits the peak-to-average-power ratio to be less than or equal to 2 (i.e., approximately 3 dB) as the sequence c is a CS. On the other hand, there is no teaching how to choose the parameters, i.e., $e_n$, $k_n$, $d_n$, based on information bits and the demonstrations are provided for random bit mappings.

End-to-End Learning with Deep Learning

Autoencoder

Autoencoders are a specific type of neural networks, where the inputs are mapped to themselves, i.e., the network is trained to approximate the identity operation. Typically, an autoencoder contains a central layer containing fewer nodes than inputs. It can be considered as two half-networks: the encoder and decoder map either to or from a reduced set of feature variables embodied in central layer nodes. Autoencoders provides an intuitive approach to non-linear dimensionality reduction, i.e., non-linear principal component analysis (PCA).

For the communication point-of-view, transmitter-channel-receiver can also be thought as an autoencoder as "the fundamental problem of communication is that of reproducing at one point either exactly or approximately a message selected at another point." It has been shown that the transmit map the information bits to a higher dimensional space through a neural network (e.g., deep neural network (DNN, convolutional neural network (CNN)) and the receiver 200 decodes the sequence in the higher-dimension space by also using another network. The coefficients of the networks can be obtained through an offline or online training procedure. In literature, it has been shown that autoencoders can also be combined with OFDM-based waveforms, called AE-OFDM.

Backpropagation Algorithm

Backpropagation (BP) is a method to calculate the gradients of the learnable parameters in a network with multiple layers for a given set of inputs and a loss function. After the loss is calculated for a given set of inputs, the gradients for the learnable parameters in each layer, typically in a stochastic way, are calculated starting from the last layer and propagates to the input. After the gradients are calculated, the learnable parameters are updated based on various algorithmic methods, e.g., gradient descent.

Prior-Art Deep Learning Layers

Let $\mathbb{M} =\{x^{(i)} | n=1: N\}$ be a minibatch. The output of a layer can be expressed as $y^{(i)}=f(x^{(i)}; \theta)$, where $\theta$ corresponds to the parameter vector. The loss function can be expressed as $$J(\theta) = \frac{1}{N}\sum_{i=1}^{N} L(y^{(i)}, x^{(i)}, \theta) \quad (14)$$

where $L(y^{(i)}, x^{(i)}, \theta)$ is the per-example loss function. Because of the additive loss functions, the gradient $\nabla_\theta J(\theta)$ can be calculated as $$\nabla_\theta J(\theta) = \frac{1}{N}\sum_{i=1}^{N} \nabla_\theta L(y^{(i)}, x^{(i)}, \theta). \quad (15)$$

Fully-Connected Layer

The fully-connected layer can be expressed as $$y = f(x; W, b) = Wx + b \tag{16}$$

where $W \in \mathbb{R}^{K \times M}$ be a matrix containing the weights of a linear transformation and $b \in \mathbb{R}^{M \times 1}$ is a bias vector. Let $X = [x^{(1)} \; x^{(2)} \; \ldots \; x^{(N)}] \in \mathbb{R}^{M \times N}$ be a matrix for the minibatch and $Y = [y^{(1)} \; y^{(2)} \; \ldots \; y^{(N)}] \in \mathbb{R}^{K \times N}$ be the output of the layer. The derivative of the loss with respect to the weight $W_{ij}$ can be calculated as $$\frac{\partial J}{\partial W_{ij}} = \sum_{n=1}^{N} \sum_{k=1}^{K} \frac{\delta y_k^{(n)}}{\delta W_{ij}} \frac{\delta J}{\delta y_k^{(n)}} = \sum_{n=1}^{N} \frac{\delta y_i^{(n)}}{\delta W_{ij}} \frac{\delta J}{\delta y_i^{(n)}} = \sum_{n=1}^{N} x_j^{(n)} \frac{\delta J}{\delta y_i^{(n)}} \tag{17}$$

Therefore, $$\frac{\partial J}{\partial W} = \frac{\partial J}{\partial Y} X^T \tag{18}$$

The derivative of the loss with respect to $b_i$ can be calculated as $$\frac{\partial J}{\partial b_i} = \sum_{n=1}^{N} \sum_{k=1}^{K} \frac{\delta y_k^{(n)}}{\delta b_i} \frac{\delta J}{\delta y_k^{(n)}} = \sum_{n=1}^{N} \frac{\delta J}{\delta y_i^{(n)}} \tag{19}$$

Therefore, $$\frac{\partial J}{\partial b} = \frac{\partial J}{\partial Y} 1_{N \times 1} \tag{20}$$

The derivative of the loss with respect to $x_i$ can be calculated as $$\frac{\partial J}{\partial x_k^{(n)}} = \sum_{i=1}^{K} \frac{\delta y_i^{(n)}}{\delta x_k^{(n)}} \frac{\delta J}{\delta y_1^{(n)}} = \sum_{i=1}^{K} W_{k1} \frac{\delta J}{\delta y_1^{(n)}} \tag{21}$$

Therefore, $$\frac{\partial J}{\partial X} = W^T \frac{\partial J}{\partial Y} \tag{22}$$

Batchnorm Layer

Let $X = [x^{(1)} \; x^{(2)} \; \ldots \; x^{(N)}] \in \mathbb{R}^{M \times N}$ and $Y = [y^{(1)} \; y^{(2)} \; y^{(N)}] \in \mathbb{R}^{M \times N}$ be the input and output of the layer, respectively. For ith row of X, the batchnorm layer can be defined as $$\mu_1 = \frac{1}{N} \sum_{n=1}^{N} x_i^{(n)} \tag{23}$$

$$\sigma_i^2 = \sum_{n=1}^{N} (x_i^{(n)} - \mu_1) \tag{24}$$

$$\hat{x}_i^{(n)} = (x_i^{(n)} - \mu_1)(\sigma^2 + \epsilon)^{-\frac{1}{2}} \tag{25}$$

$$y_i^{(n)} = y_i \hat{x}_i^{(n)} + \beta_i \tag{26}$$

The derivative of the loss with respect to the weight $\beta_i$ can be calculated as $$\frac{\partial J}{\partial \beta_i} = \sum_{n=1}^{N} \sum_{k=1}^{K} \frac{\delta y_k^{(n)}}{\delta \beta_i} \frac{\delta J}{\delta y_k^{(n)}} = \sum_{n=1}^{K} \frac{\delta J}{\delta y_i^{(n)}} \tag{27}$$

Therefore, $$\frac{\partial J}{\partial \beta} = \frac{\partial J}{\partial Y} 1_{N \times 1} \tag{28}$$

The derivative of the loss with respect to the weight $\gamma_i$ can be calculated as $$\frac{\partial J}{\partial \gamma_i} = \sum_{n=1}^{N} \sum_{k=1}^{K} \frac{\delta y_k^{(n)}}{\delta \gamma_i} \frac{\partial J}{\partial y_k^{(n)}} = \sum_{n=1}^{N} \hat{x}_i^{(n)} \frac{\delta J}{\delta y_i^{(n)}} \tag{29}$$

Therefore, $$\frac{\partial J}{\partial Y} = \left(\frac{\partial J}{\partial Y} \odot \hat{X}\right) 1_{N \times 1} \tag{30}$$

ReLU

The ReLU layer can be expressed as $$y = f(x) = \max\{x, 0\} \tag{31}$$

The derivative of the loss with respect to x can be calculated as $$\frac{\partial J}{\partial x} = \begin{cases} \frac{\delta J}{\delta y} & x > 0 \\ 0 & x \leq 0 \end{cases} \tag{32}$$

Non-Linear Distortion Immune End-to-End Learning for OFDM

Figure 3:
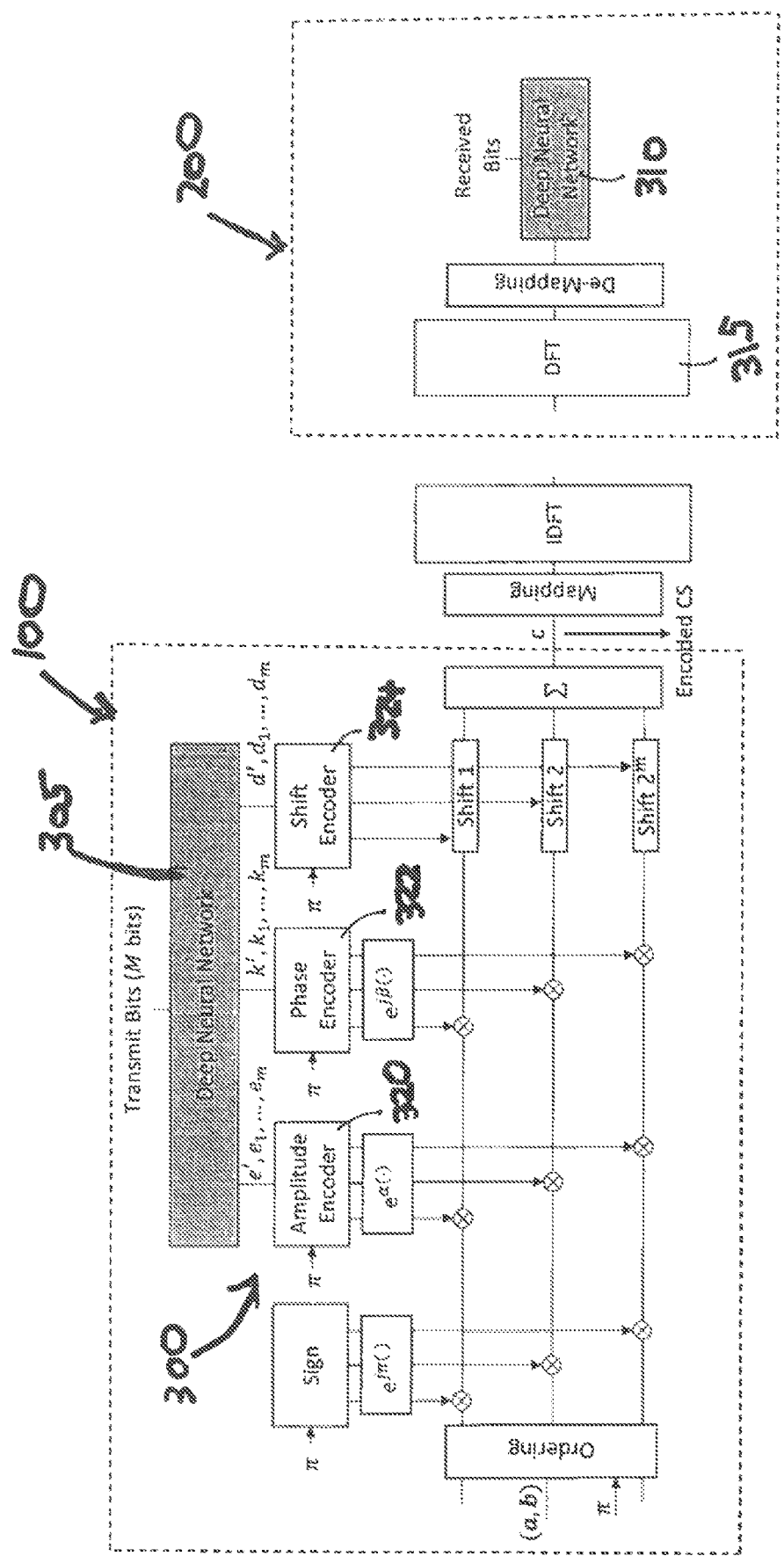
FIG. 3 shows tuning the CS encoder for OFDM with a DNN and demodulating with another DNN.

In one embodiment, the transmit bits may be mapped to the input of a first neural network (e.g., DNN, CNN) 305 (shown in FIG. 3) and the output of the neural network 305 may control the parameters of a CS encoder 300 (e.g., amplitude encoder 320, phase encoder 322, and shift encoder 324), and the encoded CS at the output of the CS encoder 300 may be transmitted through an OFDM symbol. FIG. 3 shows tuning the CS encoder 300 for OFDM with a first Deep Neural Network (DNN) 305, and demodulating with a second DNN 310. For example, as shown in FIG. 3, M transmit bits, e.g., information bits, may be processed by first DNN 305. The DNN 305 may calculate $e_n$, $k_n$, $d_n \in \mathbb{R}$ for $n = 0, 1, \ldots, m$. The calculated parameters may be processed by the amplitude, phase, and shift encoders as $$f_r(x) = e_0 + e_m x_{n(m)} + \sum_{l=1}^{m-1} e_l (x_{\pi(l)} + x_{\pi(l+1)}) \tag{33}$$

$$f_i(x) = k_0 + \sum_{l=1}^{m} k_l x_{\pi(l)} \tag{34}$$

$$f_s(x) = d_0 + \sum_{n=1}^{m} d_n x_{\pi(n)} \tag{35}$$

where $x = (x_1, x_2, \ldots x_m)$ and $x = \sum_{j}^{2^m} x_j 2^{m-j}$ for $x_j \in \mathbb{Z}_2$, $\pi$ denotes any permutation $\{1, 2, \ldots, m\}$, and $(a, b)$ be a GCP of length N. Then, the OFDM waveform can be expressed as $$p_c(t) = \sum_{x=0}^{2^m - 1} f_o(x) \times e^{j\pi f \text{sign}(x)} \times e^{\alpha f_r(x) + j\beta f_1(x)} \times e^{\frac{j 2\pi t}{T}(f_s(x) + xN)} \tag{36}$$

where $$f_o(x) = \left(p_a\left(e^{\frac{j2\pi t}{T}}\right)(1-x_{\pi(1)}) + p_b\left(e^{\frac{j2\pi t}{T}}\right)x_{\pi(1)}\right)$$

and $f_{sign}(x)=\Sigma_{l=1}^{m-1}x_{\pi(l)}x_{\pi(l+1)}$, $\alpha$ and $\beta$ are non-zero values, may be transmitted through the radio chain. The parameters $\alpha$ and $\beta$ scale the output of encoders. For example, the impacts of amplitude encoder 320 and the phase encoder 322 on the resulting waveform vanish for $\alpha=0$ and $\beta=0$, respectively. These parameters may be controlled through a communication network or prescribed (in a wireless standard). In one specific embodiment, these parameters may also be learned through neural networks.

The waveform may be implemented through an IDFT operation where the encoded CS, i.e., the sequence c where its elements are the coefficients $$e^{\frac{j2\pi t}{T}k}$$

for $k \in \mathbb{Z}$ may be the sequence in the frequency domain. The shift operation shown in FIG. 3 may pad zeros to the beginning of the input sequence on each branch. The sequence on each branch may be generated through the ordering block, which yields either sequence a or the sequence b. The sum operation in FIG. 3 may append zeros to each of the sequences to apply point-to-point summation by aligning the sequence length. The summed sequence may yield to the encoded sequence c.

At the receiver side, a DFT-based receiver 200 (e.g., OFDM receiver) may be used. In one method, the received signal is processed by DFT 315 and the resulting signal in the frequency domain may be processed by second neural network DNN 310 to receive the transmitted bits.

The overall impact of the transmitter 100, channel, and receiver 200 may be repressed as an autoencoder and the learnable parameters in each layer at the transmitter 100 and receiver 200 may be learned by using a BP algorithm. The learning may be achieved through an offline or an online learning method. Training may be performed for AWGN or Rayleigh/Rician-like channels for offline training.

In some cases, it may be important to limit the mean power beside the PAPR. To normalize the signal power, the $e_0$ parameter of the amplitude encoder 320 of the CS encoder 300 may be chosen as a function of $e_n$ for n=1, 2, . . . , m as $$e_0 = -\frac{1}{2\alpha}\sum_{n=1}^{m}\ln\left(\frac{1+e^{2\alpha e_n}}{2}\right). \quad (37)$$

Hence, the neural network may provide m values for $e_n$ for n=1, 2, . . . , m. Note that the variable $e_n$ scales the half of the coefficients by $e^{\alpha e_n}$. Therefore, the encoded CS power is scaled up by $$\frac{(1+e^{2\alpha e_n})}{2}.$$

For all $e_n$ for n=1, 2, . . . , m, the total power factor can be calculated as $$\gamma = \prod_{n=1}^{m}\frac{1+e^{2\alpha e_n}}{2}.$$

Therefore, to normalize the sequence power, e' should be selected such that $$e^{2\alpha e_0} = \frac{1}{\gamma}.$$

As a result, $$e_0 = \frac{1}{2\alpha}\ln\frac{1}{\gamma} = -\frac{1}{2\alpha}\sum_{n=1}^{m}\ln\left(\frac{1+e^{2\alpha e_n}}{2}\right).$$

Figure 4:
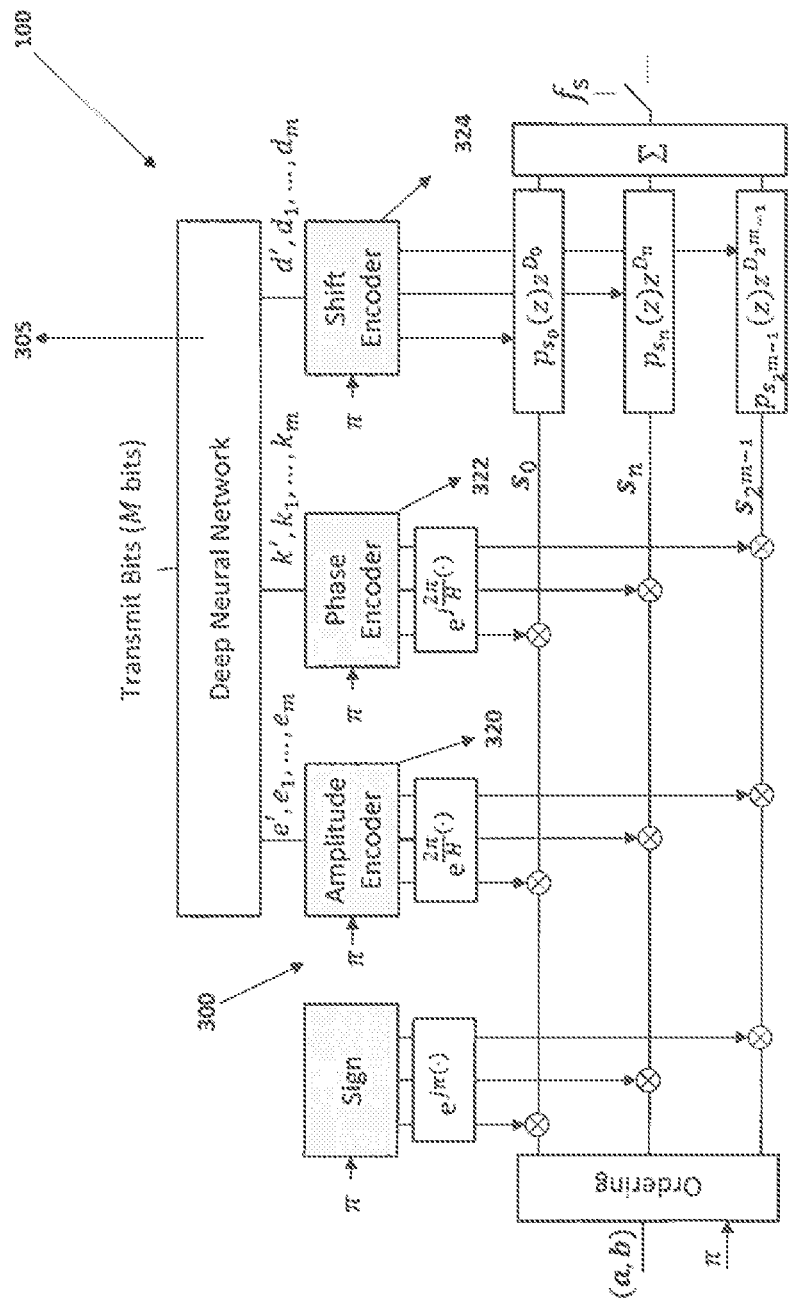
FIG. 4 shows a transmitter diagram for real-valued output of the shift encoder.

In case of real-valued output for the shift encoder (e.g., non-integer values for $D_0, D_1, \ldots D_{2^m-1}$ where $D_x$ denotes $f_{shift}(x)$ for $x=(x_1 x_2, \ldots x_m)$ and $x=\Sigma_j 2^{\tilde{m}}x_j 2^{m-j}$ for $x_j \in \mathbb{Z}_2$), the transmitter 100 may generate the waveform by sampling the summation of the polynomial output, as illustrated as in FIG. 4, where the polynomials on each branch may be sampled with the rate of $f_s$. FIG. 4 shows a transmitter diagram for transmitter 100 for real-valued output of the shift encoder 324.

Learning Amplitude and Phase Bit Mappings and Golay Layer

In one method, to reduce the training complexity, the shift encoder 324 may be controlled manually (e.g., either by a communication network or it is prescribed) to adjust the position of the non-zero elements of the encoded sequence, while the amplitude encoder 320 and phase encoder 322 may be tuned with a neural network 305 and the information bits mapped to the tuned parameters.

Figure 5:
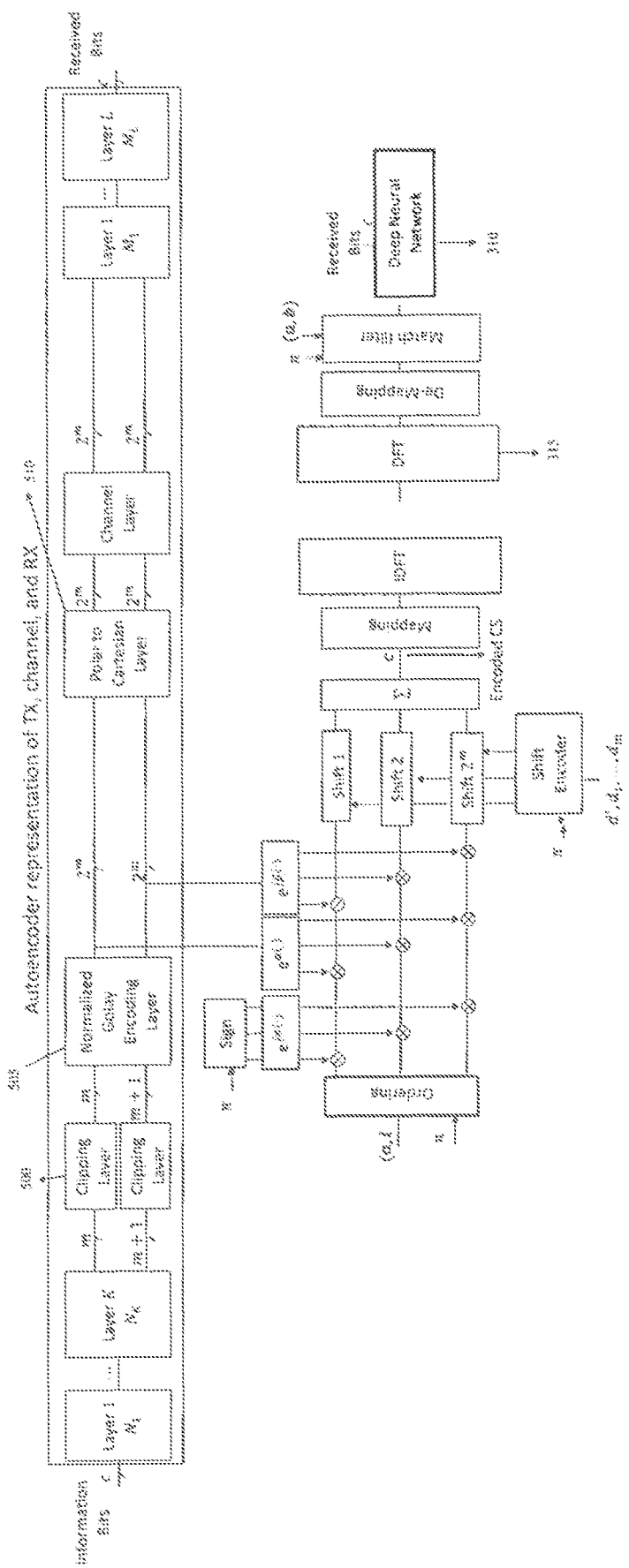
FIG. 5 shows controlling only amplitude and phase encoders of Golay layer with a DNN over an OFDM transmission/reception and forming an autoencoder which captures transmitter, channel, and receiver behaviors.

As exemplified in FIG. 5, the information bits may be processed by multiple layers (e.g., $N_k$ layers at the transmitter 100). These layers may be a combination of some prior-art layers such as softmax, ReLU, batchnorm, convolution layer, fully-connected layer, etc. Then, the output of these layers, e.g., vectors, may pass through a set of clipping layers 500 to avoid large numbers. The description of the clipping layer 500 is provided herein and generates m input for the amplitude encoder and m+1 input for the phase encoder of the normalized Golay encoding layer 505 described herein. The transmitted waveform in continuous-time may be calculated as $$p_c(t) = \sum_{x=0}^{2^m-1} f_o(x) \times e^{j\pi f_{sign}(x)} \times e^{\alpha f_r(x)+j\beta f_1(x)} \times e^{\frac{j2\pi t}{T}(f_s(x)+xN)} \quad (38)$$

where $$f_o(x) = \left(p_a\left(e^{\frac{j2\pi t}{T}}\right)(1-x_{\pi(1)}) + p_b\left(e^{\frac{j2\pi t}{T}}\right)x_{\pi(1)}\right)$$

and $f_{sign}(x)=\Sigma_{l=1}^{m-1}x_{\pi(l)}x_{\pi(l+1)}$ and $f_s(x)=d_0+\Sigma_{n=1}^{m}d_n x_{\pi(n)}$ are fixed. The shift encoder $f_s(x)$ may be configured based on the resource allocation indicated by the network. A cyclic prefix may also be prepended to the transmitted signal. The transmitter 100 may use a DFT operation to implement $p_c(t)$, as in an OFDM scheme. FIG. 5 shows controlling only amplitude and phase encoders of Golay layer 505 with a DNN over an OFDM transmission/reception and forming an autoencoder which captures transmitter 100, channel, and receiver 200 behaviors.

At the receiver side, an OFDM receiver 200 may be used. In one method, the received signal is processed by DFT 315 and the resulting signal in the frequency domain first processed by a matched filter obtained by exploiting the fixed $f_o(x)$. The resulting sequence may be processed by a deep neural network DNN 310 to receive the transmitted bits, e.g., $M_L$ layers may be utilized. The layers at the receiver side may be a combination of some prior-art layers such as softmax, ReLU, batchnorm, convolution layer, fully-connected layer, etc.

The overall impact of the transmitter 100, channel, and receiver 200 may be repressed as an autoencoder as shown in FIG. 5 and the learnable parameters in each layer may be learned by using a BP algorithm. The learning may be achieved through an offline or an online learning method. A Polar-to-Cartesian layer 510 described herein may also be used during the offline/online training.

Golay Layer

The output of a Golay layer 505 may be a set of sequences associated with $f_r(x)$ and $f_i(x)$ (i.e., the sequences generated by listing the values of the function as $x=(x_1, x_2, \ldots x_m)$ ranges over its $2^m$ values where $x=\sum_j 2^m x_j 2^{m-j}$) given by $$f_r(x) = e_0 + e_m x_{\pi(m)} + \sum_{l=1}^{m-1} e_l (x_{\pi(l)} + x_{\pi(l+1)}) \quad (39)$$

$$f_i(x) = k_0 + \sum_{l=1}^{m} k_l x_{\pi(l)} \quad (40)$$

where the inputs of a Golay layer 505 may be $e_n \in \mathbb{R}$, $$k_n \in \left[0, \frac{2\pi}{\beta}\right)$$

for $n=0, 1, \ldots, m$. In one embodiment, the parameter $e_0$ in Golay layer 505 may be chosen as a function of $e_n \in \mathbb{R}$ for $n=1, 2, \ldots, m$ as $$e_0 = \frac{1}{2\alpha} \sum_{n=1}^{m} \ln\left(\frac{1 + e^{2\alpha e_n}}{2}\right) \quad (41)$$

The derivative $f_r(x)$ with respect to $e_n$ can be obtained as $$\frac{df_r(x)}{de_n} = \begin{cases} (x_{\pi_n} + x_{\pi_{n+1}}) - \dfrac{e^{2\alpha e_n}}{1 + e^{2\alpha e_n}}, & n < m \\ x_{\pi_m} - \dfrac{e^{2\alpha e_n}}{1 + e^{2\alpha e_n}} & n \geq m \end{cases} \quad (42)$$

since $$\frac{de_0}{de_n} = -\frac{e^{2\alpha e_n}}{1 + e^{2\alpha e_n}}.$$

Similarly, the derivative $f_i(x)$ with respect to $k_n$ and $k_0$ can be calculated as $$\frac{df_i(x)}{dk_n} = x_{\pi_n} \quad (43)$$

and $$\frac{df_i(x)}{dk_0} = 1. \quad (44)$$

The derivative of the loss with respect to the $e_k^{(n)}$ can be calculated as $$\frac{\partial J}{\partial e_k^{(n)}} = \sum_{x=1}^{2^m} \frac{\delta f_r^{(n)}(x)}{\delta e_k^{(n)}} \frac{\delta J}{\delta f_r^{(n)}(x)} = \sum_{i=1}^{2^m} \Lambda_{kt} \frac{\delta J}{\delta f_r^{(n)}(x)} \quad (45)$$

The derivative of the loss with respect to the $k_k^{(n)}$ can be calculated as $$\frac{\partial J}{\partial k_k^{(n)}} = \sum_{x=1}^{2^m} \frac{\delta f_i^{(n)}(x)}{\delta k_k^{(n)}} \frac{\delta J}{\delta f_i^{(n)}(x)} \quad (46)$$

The derivative of the loss with respect to the $k'^{(n)}$ can be calculated as $$\frac{\partial J}{\partial k_0^{(n)}} = \sum_{x=1}^{2^m} \frac{\delta f_i^{(n)}(x)}{\delta k'^{(n)}} \frac{\delta J}{\delta f_i^{(n)}(x)} = \sum_{i=1}^{2^m} \frac{\delta J}{\delta f_r^{(n)}(x)} \quad (47)$$

The derivative of the loss with respect to the $d_k^{(n)}$ can be calculated as $$\frac{\partial J}{\partial d_k^{(n)}} = \sum_{x=1}^{2^m} \frac{\delta f_i^{(n)}(x)}{\delta d_k^{(n)}} \frac{\delta J}{\delta f_j^{(n)}(x)} \quad (48)$$

The derivative of the loss with respect to the $d_0^{(n)}$ can be calculated as $$\frac{\partial J}{\partial d_0^{(n)}} = \sum_{x=1}^{2^m} \frac{\delta f_i^{(n)}(x)}{\delta d_0^{(n)}} \frac{\delta J}{\delta f_i^{(n)}(x)} = \sum_{i=1}^{2^m} \frac{\delta J}{\delta f_r^{(n)}(x)} \quad (49)$$

Therefore, $$\frac{\partial J}{\partial e} = \Lambda^T \frac{\partial J}{\partial Y} \quad (50)$$

$$\frac{\partial J}{\partial k} = \Omega^T \frac{\partial J}{\partial Y} \quad (51)$$

$$\frac{\partial J}{\partial d} = S^T \frac{\partial J}{\partial Y} \quad (52)$$

where $$\Lambda = [ (x_{\pi(1)} + x_{\pi(2)})_2 \ (x_{\pi(2)} + x_{\pi(3)})_2 \ \ldots \ (x_{\pi(m-1)} + x_{\pi(m)})_2 \ x_{\pi(m)} ] - \frac{e^{2ae_n}}{1 + e^{2ae_n}}$$ (53)

$$\Omega = S = [ 1 \ x_{\pi(1)} \ x_{\pi(2)} \ \ldots \ x_{\pi(m)} ]$$ (54)

where $e = [ e_1 \ e_2 \ \ldots \ e_m ], k = [ k_0 \ k_1 \ \ldots \ k_m ]$, and $d = [ d_0 \ d_1 \ \ldots \ d_m ]$.

Clipping Layer

The clipping layer 500 can be expressed as $$y = f(x) = \min\{\max\{x, r_1\}, r_2\}$$ (55)

The derivative of the loss with respect to the weight x can be calculated as $$\frac{\partial J}{\partial x} = \begin{cases} 0 & x \leq r_2 \\ \frac{\delta J}{\delta y} & r_1 \leq x \leq r_2 \\ 0 & r_1 \leq x \end{cases}$$ (56)

Polar-to-Cartesian Layer $$y_r = f(x, y) = \Re\{e^{\alpha y} e^{j\beta x}\} = e^{\alpha y} \cos(\beta x)$$ (57)

$$y_i = g(x, y) = \Im\{e^{\alpha y} e^{j\beta x}\} = e^{\alpha y} \sin(\beta x)$$ (58)

The derivatives of the loss with respect to x and y can be calculated as $$\frac{\partial J}{\partial x} = \frac{\partial y_r}{\partial x} \frac{\partial J}{\partial y_r} + \frac{\partial y_i}{\partial x} \frac{\partial J}{\partial y_i} = [ -\beta e^{\alpha y} \sin(\beta x) \ \beta e^{\alpha y} \cos(\beta x) ] \begin{bmatrix} \frac{\partial J}{\partial y_r} \\ \frac{\partial J}{\partial y_i} \end{bmatrix}$$ (59)

$$\frac{\partial J}{\partial y} = \frac{\partial y_r}{\partial y} \frac{\partial J}{\partial y_r} + \frac{\partial y_i}{\partial y} \frac{\partial J}{\partial y_i} = [ \alpha e^{\alpha y} \cos(\beta x) \ \alpha e^{\alpha y} \sin(\beta x) ] \begin{bmatrix} \frac{\partial J}{\partial y_r} \\ \frac{\partial J}{\partial y_i} \end{bmatrix}$$ (60)

Example

Assume that 9 information bits need to be transmitted. In this case, the communication system may need to generate $M = 2^9$ codewords. Let m=5, H=4, $\alpha=1$, and $$\beta = \frac{2\pi}{H} = \frac{\pi}{2}$$

and the permutation $\pi = (1,2,3,4,5)$. Therefore, based on Equations (39), (40) and (41), the Golay encoder may be expressed as $$f_r(x) = e_a + e_5 x_5 + \sum_{l=1}^{4} e_l (x_l + x_{l+1})$$ (61)

$$f_i(x) = k_0 + \sum_{l=1}^{5} k_l x_l$$ (62)

where the inputs of a Golay layer 505 may be $e_n \in \mathbb{R}$, $k_n \in [0,4)$ for n=0, 1, . . . , 5 where $$e_0 = \frac{1}{2} \sum_{n=1}^{5} \ln\left( \frac{1 + e^{2e_n}}{2} \right).$$ (63)

The OFDM waveform may be expressed as $$p_c(t) = \sum_{x=0}^{2^5 - 1} e^{j\pi f_{sign}(x)} \times e^{\alpha f_r(x) + j\beta f_1(x)} \times e^{\frac{j2\pi t}{T}(xN)}$$ (64)

where $f_{sign}(x) = \sum_{l=1}^{m-1} x_l x_{l+1}$. In this example, learning layers at the transmitter 100 control the Golay layer parameters as $0.1 \leq \dot{e}_n \leq 0.5$ for n=1,2, . . . , 5 and $-2 \leq k_n \leq 2$ for n=0, 1, . . . , 5. M=512 different possible messages may be mapped to the values of $e_n$ for n=1, 2, . . . , 5 and $k_n$ for n=0, 1, . . . , 5. The parameter $e_0$ is set to $$\frac{1}{2} \sum_{n=1}^{5} \ln\left( \frac{1 + e^{2e_n}}{2} \right)$$

to stabilize the mean power of the signal, which is critical for power-limited AI-based transmission. At the receiver 200, an OFDM receiver may be considered and the corresponding subcarriers are processed with several neural network layers. At the receiver 200, the last layer may be a classification layer where its size is M=512 as there 512 different codewords. The transmitter 100 and receiver 200 may be considered as an autoencoder, and the expected behavior is identity operation (i.e., receiving the transmitted message). In other words, if the first codeword (e.g. information bits are (0,0,0,0,0,0,0,0,0)) is transmitted at the transmitter 100, the first element of classification layer may be closer to 1 while other 511 elements are near 0 (i.e., one-hot vector encoding form). if the second codeword is transmitted at the transmitter 100 (e.g. information bits are (0,0,0,0,0,0,0,0,1)), the second element of classification layer may be closer to 1 while other 511 elements are near 0.

An offline training with backpropagation is adopted. The design may be performed under AWGN channel where the variance of the noise is set to 2.5 dB in this example. The layer information at the transmitter 100 and receiver 200 in this example are provided in see FIG. 9, Table 1. The training batch size is set to 100, i.e., the gradients are calculated over 100 different 9 information bits. After the layers at the transmitter 100 and receiver 200 are trained, the learned parameters may be used in an OFDM transmission as illustrated in FIG. 5.

Figure 6:
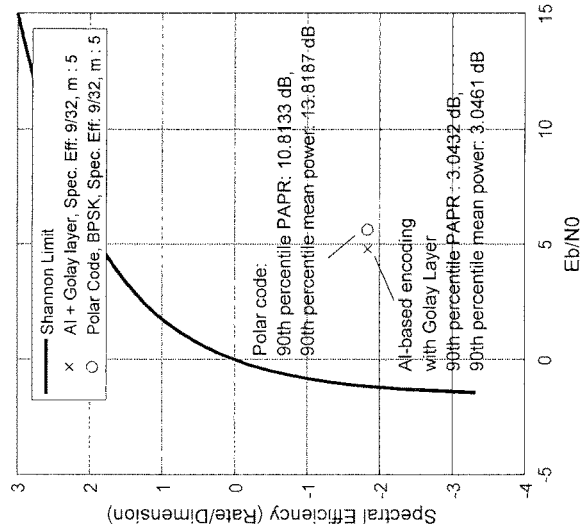
FIG. 6 block error rate, bit error rate, and spectral efficiency of the AI-based learning with Golay layer.
Figure 6:
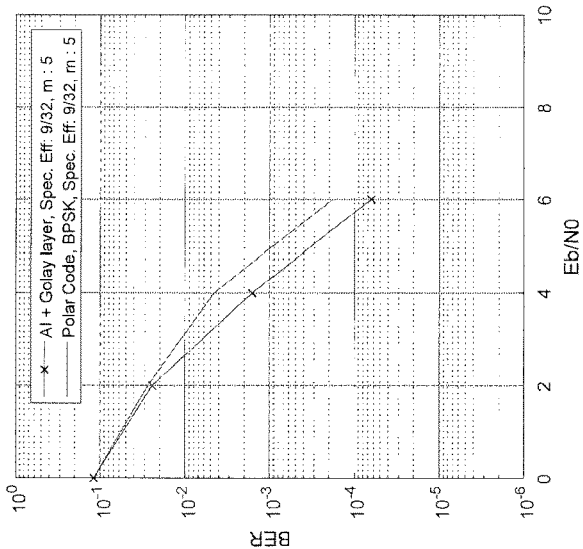
Figure 6:
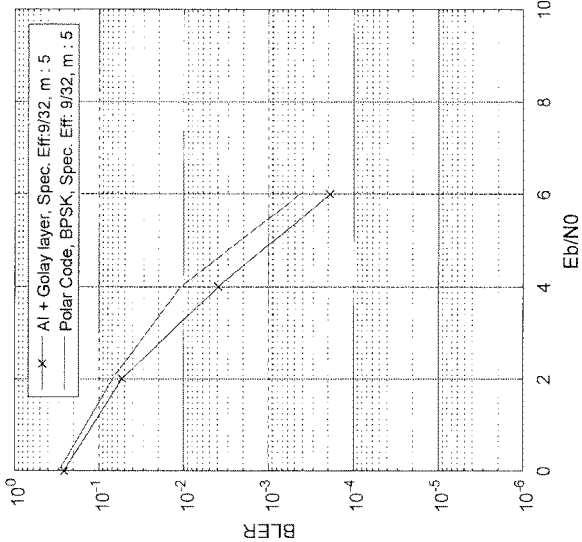
Figure 7:
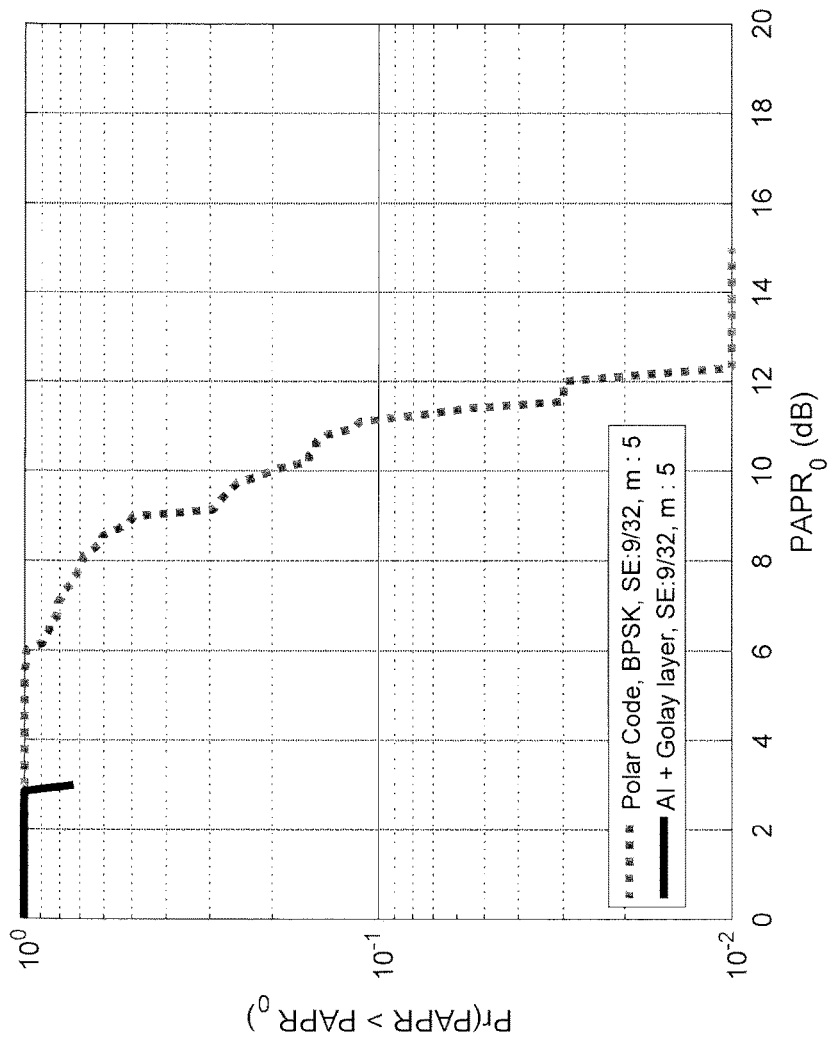
FIG. 7 shows a PAPR comparison.

In FIG. 6, we provide block error rate (BLER), bit error rate (BER), and spectral efficiency (SE) as compared to Shannon limit for the AI-based learning with Golay layer and Polar code under the same SE (i.e., 9 bits over 32 subcarrier) for OFDM transmission. Polar code is optimized at 3 dB SNR. AI-based learning with Golay layer is slightly better than the Polar code in this scenario in terms of BLER and BER while it offers a major improvement for PAPR, i.e., more 7 dB PAPR gain. While Golay layer keeps the PAPR less than or equal to 3 dB PAPR, Polar code causes large PAPR, i.e., 10.8 dB PAPR for $90^{th}$ percentile, while also cause large fluctuations on the mean power (13.8 dB for $90^{th}$ percentile). The PAPR distributions of the signals are provided in FIG. 7. FIG. 6 shows block error rate, bit error rate, and spectral efficiency of the AI-based learning with Golay layer. FIG. 7 shows a PAPR comparison.

Figure 8:
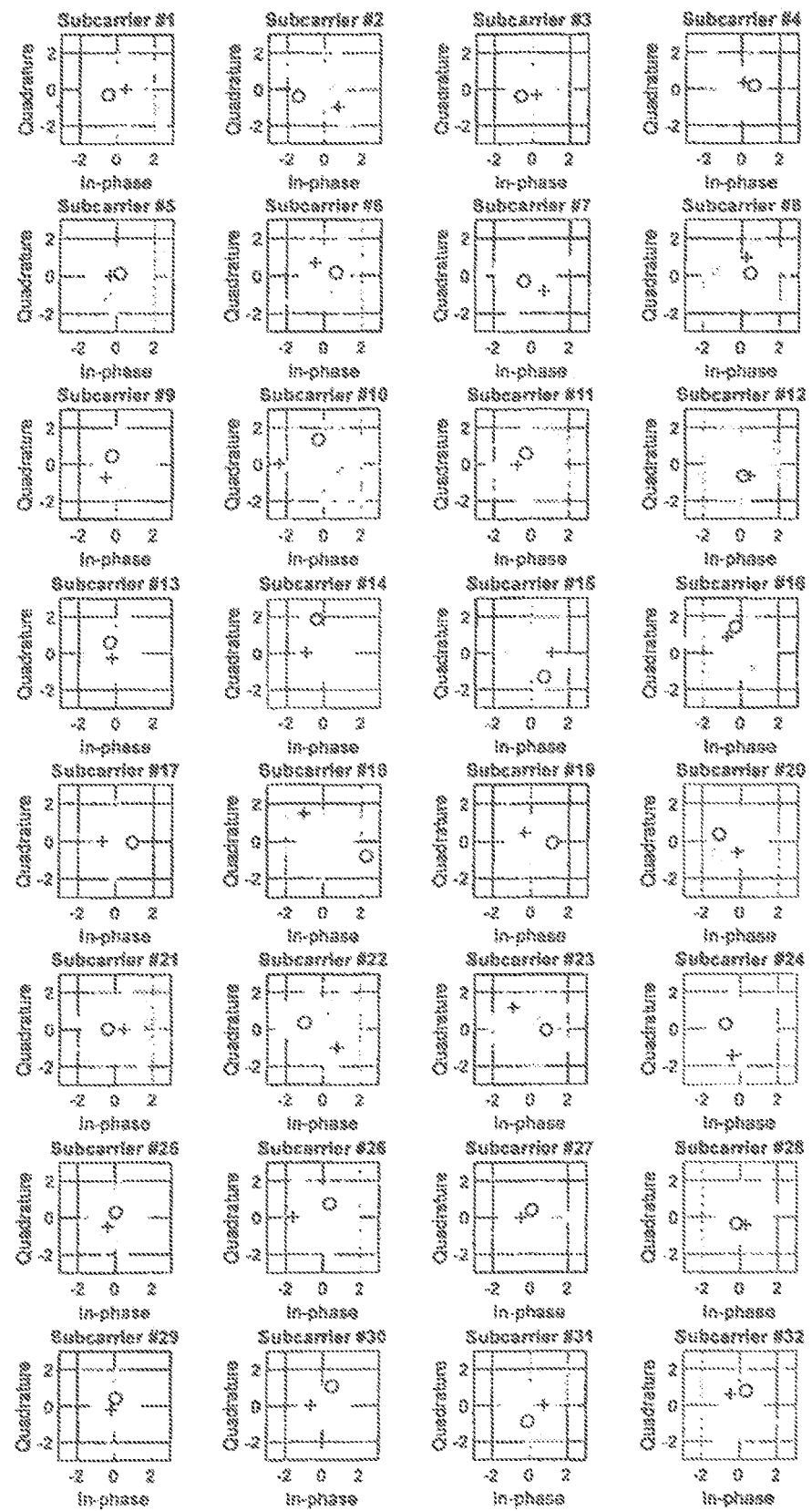
FIG. 8 shows the distribution of the elements of the sequence on different subcarriers (i.e., learned constellation per subcarrier)

In FIG. 8, we show the learned constellation per subcarriers while the points marked by a circle, plus, and cross indicate the elements of three different encoded sequences in the frequency domain for each OFDM subcarrier. Although the constellation per subcarrier does not follow traditional constellations, e.g., M-QAM alphabet, the sequences are still differentiable at the receiver side with good BER/BLER performance. FIG. 8 shows the distribution of the elements of the sequence on different subcarriers (i.e., learned constellation per subcarrier).

Learning Amplitude and Phase Offsets for Higher Data Rates

In one method, the sets for phase and amplitude $e\_n$, $k\_n$ for $n=0, 1, \ldots, m$ may be predetermined and their sets are offset by neural networks to be able to transmit large amount of bits. For example, $e\_n \in e\_(fix,n) + \Delta e\_n$ and $k\_n \in k\_(fix, n) + \Delta k\_n$ where $e\_(fix,n) \in S = \{-0.5, 0.8, 1.2, 1.5\}$ and $k\_(fix, n) \in Z\_4 = \{0,1,2,3\}$ and neural network is trained to obtain $\{\Delta k\_n\}$ and $\{\Delta e\_n\}$ for $n=0, 1, \ldots, m$. In another method, neural network may obtain multiple $\{\Delta k\_n\}$ and $\{\Delta e\_n\}$ for $n=0, 1, \ldots, m$.

At the receiver 200, a neural network DNN 310 may be utilized a long with a traditional decoder (no learning capability). While the neural network 310 subtracts the impact of the offset $\{\Delta k\_n\}$ and $\{\Delta e\_n\}$ from the received signal, the traditional decoder may decode the remaining signal.

The different parts of the methods disclosed in herein may be combined. They can be applied for the fields (e.g., computer vision, image processing, etc.). For example, the Golay layer 505 may be utilized to limit the distribution of the values for the inputs of the following layer.

The current disclosure has demonstrated the efficacy of the methods disclosed herein through computer analysis. The current disclosure may be implemented in a baseband/RF chipset of a radio communication device. The method may also be prescribed in a wireless communication standard that allows machine learning-based communications.

The disclosed methods can also be applied to communication devices that operate under power-limited link budgets while autonomously optimizing its error rate performance for auto-encoder OFDM. The disclosed method may decrease the training duration as the transmitter 100 and receiver 200 do not deal with the PAPR problem with the Golay layer 505. Golay layer 505 itself ensure the low PAPR.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for avoiding non-linear distortion in end-to-end learning communication systems, the communication system comprising a transmitter and a receiver, the method comprising:
   mapping transmitted information bits to an input of a first neural network;
   controlling, by an output of the neural network, parameters of a complementary sequence (CS) encoder, producing an encoded CS;
   transmitting the encoded CS through an orthogonal frequency division multiplexing (OFDM) signal;
   processing, by Discrete Fourier Transform (DFT), the encoded CS in a frequency domain, to produce a received information signal; and
   processing, by a second neural network, the received information signal.

2. The method of claim 1, wherein the CS encoder comprises an amplitude encoder, a phase encoder, and a shift encoder.

3. The method of claim 2, wherein mapping the transmitted information bits to an input of a first neural network further comprises:
   manually tuning the shift encoder to adjust a position of non-zero elements of the CS;
   tuning the amplitude encoder and the phase encoder using the first neural network to produce tuned parameters; and
   mapping the information bits to the tuned parameters.

4. The method of claim 2, wherein, sets for the amplitude encoder and phase encoder are predetermined and offset by the first neural network in order to be able to transmit a large number of information bits.

5. The method of claim 4, wherein the receiver further comprises a decoder, the method further comprising:
   subtracting, by the second neural network, the offsets from the received information signal to produce a remaining information signal; and
   decoding, by the decoder, the remaining information signal.

6. The method of claim 1, wherein the encoded CS is processed by multiple layers at the transmitter, the layers including at least a Golay layer, the method further comprising:
   controlling only the amplitude encoder and the phase encoder of the Golay layer; and
   forming an autoencoder which captures transmitter, channel, and receiver behaviors.

7. The method of claim 6, wherein the layers further include a clipping layer configured to limit the amplitude of the information signal.

8. The method of claim 6, wherein the layers further include a Polar-to-Cartesian layer configured to convert the coordinate system from Polar coordinates to a Cartesian coordinate system.

9. An end-to-end learning communication system for avoiding non-linear distortion, the system comprising:
   a transmitter implemented by processing circuitry, the processing circuitry comprising a processor and a memory containing instructions executable by the processor, the processor of the transmitter configured to:
   map transmitted information bits to an input of a first neural network;
   control, by an output of the neural network, parameters of a complementary sequence (CS) encoder, producing an encoded CS; and transmit the encoded CS through an orthogonal frequency division multiplexing (OFDM) signal; and a receiver implemented by processing circuitry, the processing circuitry comprising a processor and a memory containing instructions executable by the processor, the processor of the receiver configured to:
- process, by Discrete Fourier Transform (DFT), the encoded CS in a frequency domain, to produce a received information signal; and
- process, by a second neural network, the received information signal.

10. The system of claim 9, wherein the CS encoder comprises an amplitude encoder, a phase encoder, and a shift encoder.

11. The system of claim 10, wherein mapping the transmitted information bits to an input of a first neural network further comprises:
- manually tuning, by the processor of the transmitter, the shift encoder to adjust a position of non-zero elements of the CS;
- tuning, by the processor of the transmitter, the amplitude encoder and the phase encoder using the first neural network to produce tuned parameters; and
- mapping, by the processor of the transmitter, the information bits to the tuned parameters.

12. The system of claim 10, wherein the encoded CS is processed by multiple layers at the transmitter, the layers including at least a Golay layer, the processor of the transmitter further configured to:
- control only the amplitude encoder and the phase encoder of the Golay layer; and
- form an autoencoder which captures transmitter, channel, and receiver behaviors.

13. The system of claim 12, wherein the layers further include a clipping layer configured to limit the amplitude of the information signal.

14. The system of claim 12, wherein the layers further include a Polar-to-Cartesian layer configured to convert the coordinate system from Polar coordinates to a Cartesian coordinate system.

15. The system of claim 10, wherein sets for the amplitude encoder and phase encoder are predetermined and offset by the first neural network in order to be able to transmit a large number of information bits.

16. The system of claim 15, wherein the processor of the receiver is further configured to:
- subtract, by the second neural network, the offsets from the received information signal to produce a remaining information signal; and
- decode, by the decoder, the remaining information signal.

* * * * *